May 19, 1959 — W. H. REID, JR — 2,886,885
EXPANSION JOINT AND METHOD OF MAKING SAME
Filed Nov. 25, 1955 — 2 Sheets-Sheet 1

Inventor
Warren H. Reid, Jr.

May 19, 1959   W. H. REID, JR   2,886,885
EXPANSION JOINT AND METHOD OF MAKING SAME
Filed Nov. 25, 1955   2 Sheets-Sheet 2

Inventor
Warren H. Reid, Jr.
R. W. Furlong
Atty.

United States Patent Office 2,886,885
Patented May 19, 1959

2,886,885

EXPANSION JOINT AND METHOD OF MAKING SAME

Warren H. Reid, Jr., Sanbornville, N.H., assignor to Badger Manufacturing Company, Cambridge, Mass., a corporation of Massachusetts Application November 25, 1955, Serial No. 548,978

1 Claim. (Cl. 29—421)

This invention relates to an improved expansion joint for pipe lines and a reinforcing ring therefor and pertains more specifically to an expansion joint of the type comprising a corrugated tubular expansion member or bellows provided with external reinforcing rings and a method of making the same.

It has heretofore been proposed to employ corrugated tubular expansion members in expansion joints together with reinforcing rings which have laterally curved surfaces conforming to the desired curved cross-sectional shape of the corrugations of the tubular member. Because of the complex toroidal shape of such reinforcing rings they have been difficult and expensive to manufacture and have usually been made in two or more parts joined together by means of bolts or clamps. This construction has resulted in small gaps between the joints of the several parts, which have in the past been considered to be inconsequential. However, recent studies indicate that such irregularities in the surface of the reinforcing ring, even though apparently minor in nature, lead to concentration of stresses in the bellows member where it comes in contact with such gaps or irregularities and cause premature failure of the bellows member when the latter is subjected to repeated flexing under use conditions.

One object of the present invention is to provide an expansion joint of the type described having external reinforcing rings of simplified design which are inexpensive to manufacture and light in weight.

Another object is to provide an improved expansion joint having a reinforcing ring provided with an internal connector for joining the ends thereof to provide a substantially continuous, smooth surface throughout its length free from sharp bends, edges, or gaps.

Still another object is to provide an expansion joint having a reinforcing ring of uniform circular cross-sectional shape throughout its extent which may be readily and inexpensively fabricated from pipe, tubing, or sheet metal and which provides a joint of increased durability.

A further object is to provide a method of making a joint of the type described by using the reinforcing rings as forming dies for the initial shaping of the bellows member, the rings remaining permanently in place for reinforcing purposes.

Other and further objects will be apparent from the drawings and the description which follows.

Referring to the drawings.

Figure 1:
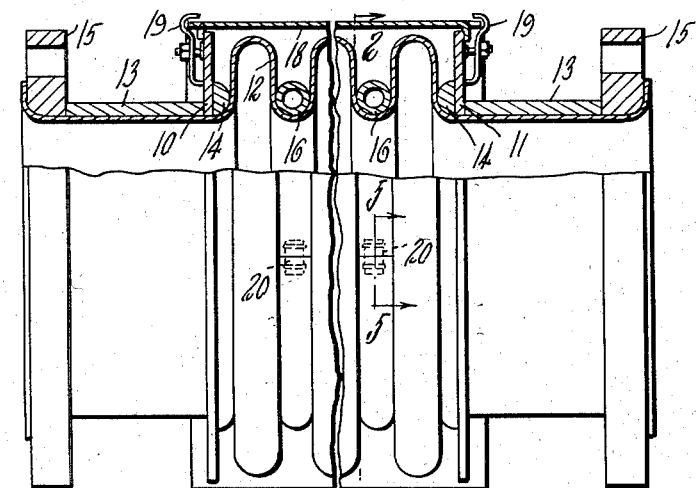
Fig. 1 is a view in side elevation, partly broken away and in section, showing one embodiment of the present invention.

As shown in Fig. 1 of the drawings, the expansion joint comprises a pair of end covers 10, 11 mounted on each end of a corrugated tubular expansion member or bellows 12 preferably made of thin, ductile metal and preferably seamless. A pair of spacing sleeves 13, 13 abut against the outer faces of end covers 10 and 11 and serve to maintain these end covers in spaced relation to mounting flanges 15, 15 which serve for mounting the expansion joint in place in a pipeline, while members 14, 14 of semi-circular cross-sectional configuration abut against the inner faces of end covers 10, 11. The rounded faces of members 14, 14 engage the first convolution of bellows member 12. These parts are held in the desired assembled relation by turning the ends of bellows member 12 outwardly over mounting flanges 15, 15. Disposed between the remaining convolutions of bellows member 12 and in close contact therewith are reinforcing or control rings 16, 16 which serve to reinforce the bellows member against radial expansion upon subjection to internal pressure. These members also serve as a fulcrum about which the wall of the convolutions of the bellows member flex as the bellows member is extended or compressed axially during use. A generally cylindrical dust cover 18 may be mounted over end covers 10, 11, its ends being turned in to retain it in place while permitting axial and lateral movement of the two flanges with respect to each other during use of the expansion joint. In order to maintain the expansion joint immovable during storage and shipment prior to installation, brackets 19, 19 are bolted to the outer faces of end covers 10, 11 in position to engage the margin of dust cover 18. Brackets 19, 19 are removed to render the expansion joint operative.

Each reinforcing ring 16 is of uniform circular cross-sectional shape throughout its extent and is formed from pipe or tubing having its ends secured in closely abutting relation so that the reinforcing ring is free from sharp edges at the juncture of its ends. In order to hold the abutting ends of the ring 16 together, an internal connecting member is provided, as best shown in Figs. 5–8. The connector comprises a cylindrical plug 20 of such size as to slide readily into the hollow bore of control ring 16. Plug 20 is provided with a pair of spaced annular grooves 22, 22 in which are seated resilient snap rings 24, 24 of such size and curvature as to project resiliently beyond the outer face of plug 20 and having beveled edges to facilitate insertion into the ends of control ring 16.

Each of the abutting ends of pipe ring 16 is provided with an internal annular groove forming a shoulder 26, and the interior of the pipe or tube 16 is of gradually increasing diameter from the shoulder to the adjacent end of the tube as indicated at 28. The distance between the two grooves 22, 22 of plug 20 is exactly equal to the distance between the two internal shoulders 26 of pipe ring 16 when the ends of pipe ring 16 are in closely abutting relation.

The reinforcing rings 16 are assembled by seating snap rings 24, 24 in grooves 22 of plug 20 then forcing the plug into each of the mating ends of tube 16, rings 24 being readily compressed by taper 28 during this operation until they are beyond shoulders 26, whereupon they spring outwardly and engage over the shoulders, thus holding the ends of ring 16 in closely abutting relationship to provide an external surface which is smooth and substantially continuous throughout its extent, providing a uniform bearing surface for the convolutions of bellows 12, which distributes the stress uniformly.

Figure 3:
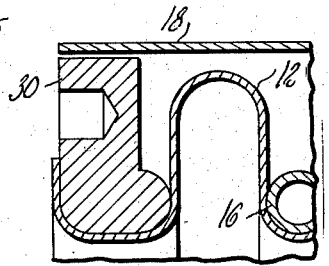
Fig. 3 is a view in longitudinal section on an enlarged scale, partly broken away, showing a second embodiment.
Figure 4:
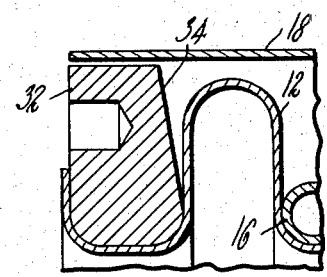
Fig. 4 is a view corresponding to Fig. 3 showing still a third embodiment.
Figure 2:
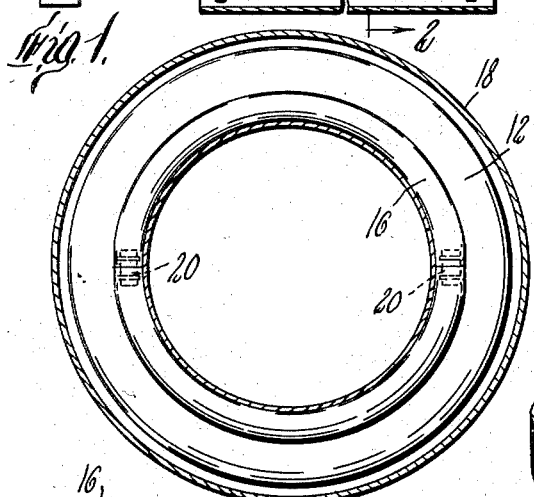
Fig. 2 is a view in cross section taken along the line 2—2 of Fig. 1.
Figure 5:
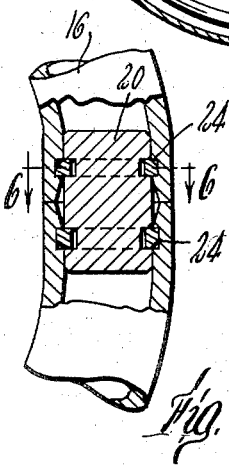
Fig. 5 is a view on an enlarged scale, partly broken away and in section, of the fastening between the ends of the reinforcing ring.
Figure 6:
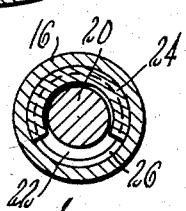
Fig. 6 is a view in section taken along line 6—6 of Fig. 5.
Figure 7:
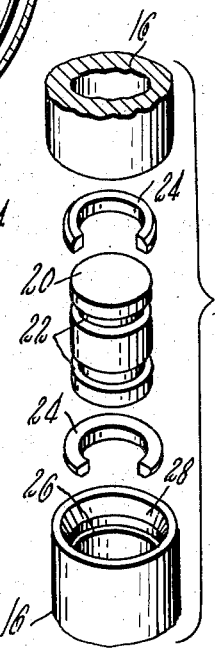
Fig. 7 is an exploded view showing the several parts of the joint shown in Fig. 6 prior to assembly.
Figure 8:
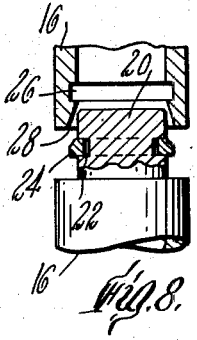
Fig. 8 is a view in elevation, partly broken away and in section, showing a stage in the assembly of the ring.

In the embodiment shown in Fig. 3, flange 30 is cast or machined from a single piece of metal to provide the same shape as cover 10 and abutting member 14 of Fig. 1. In the embodiment shown in Fig. 4, flange 32 is likewise formed from a single piece of metal but is of slightly different shape, having a flat bearing surface 34 which engages the outer lateral face of the end convolution of bellows member 12 when the joint is compressed. The slope of bearing surface 34 is such that the space between it and the adjacent convolution of bellows 12 is less than one-half the space between adjacent convolutions of bellows 12 so that bearing surface 34 will contact the lateral face of the bellows convolution before adjacent bellows convolutions contact each other. Contact of the bearing surface with the adjacent bellows convolution will provide increased resistance to further compression, reducing the possibility that distortion of the remaining convolutions of the bellows member will occur upon excessive compression or internal pressure.

Figure 9:
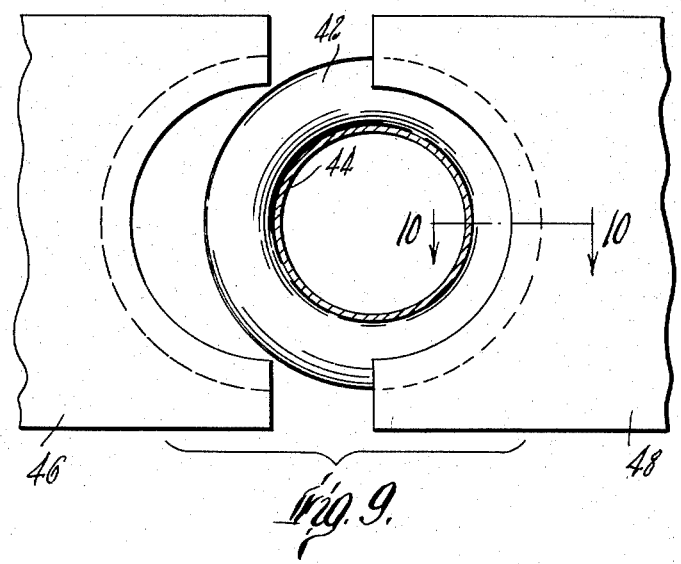
Fig. 9 is a cross-sectional view partly broken away showing a stage in the manufacture of the expansion joint.
Figure 10:
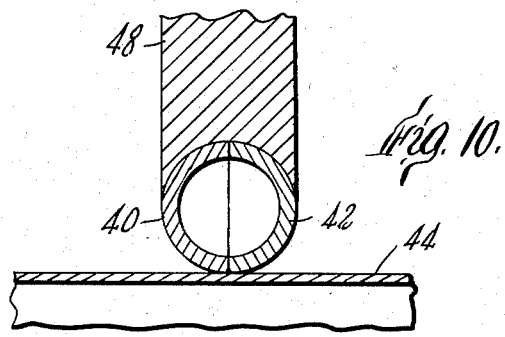
Fig. 10 is a view in section taken along the line 10—10 of Fig. 9.
Figure 11:
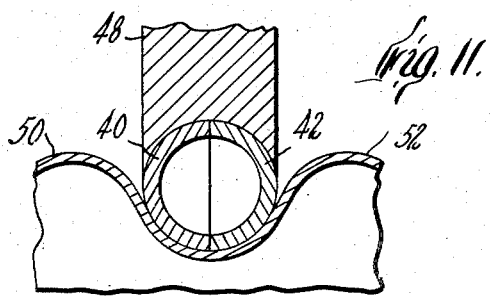
Fig. 11 is a view corresponding to Fig. 10 showing a later stage in the manufacturing operation.

Still another embodiment of the invention is shown in Figs. 9 to 11. In this embodiment each reinforcing ring comprises a pair of endless mating ring members 40, 42, each of which is of uniform semi-circular cross-sectional configuration throughout its extent. Preferably, each ring member is concave on its mating face so that when assembled each pair forms a hollow ring or torus with the mating faces of the ring members abutting in a plane which is perpendicular to the axis of the bellows member in the finished expansion joint. The ring members 40, 42 may be conveniently and inexpensively fabricated from sheet metal by a cutting and stamping operation alone, although it is sometimes desirable to machine the abutting or mating edges in order to ensure a smooth outer face of the ring, free from gaps and irregularities.

In manufacturing the embodiment of the expansion joint shown in Figs. 9 to 11, the pair of mating ring members 40, 42 are assembled in the desired positions about a generally cylindrical tube 44 of ductile metal such as copper, stainless steel or the like, and are clamped in the desired mating abutting relation by means of a pair of clamping die members 46, 48 which closely engage the outer curved face of abutting ring members 40, 42. The parting line between clamping die members 46, 48 extends at right angles to the parting line between ring members 40, 42, the latter meeting in a plane perpendicular to the axis of tube 44. Clamping die members 46, 48 may be held in clamping relation with ring members 40, 42 by hydraulic means or any other suitable means (not shown). Fluid under pressure is then introduced into the interior of tube 44 from any suitable source to force the wall of the tube outwardly on each side of mating ring members 40, 42 as shown in Fig. 11 to form convolutions 50, 52 which embrace the abutting ring members and hold them permanently in closely abutting mating relation. Clamping dies 46, 48 may then be removed, leaving the pair of ring members permanently in place as a smooth-surfaced reinforcing ring for the expansion joint. Expansion of the tube to form the bellows may be carried out in two or more stages, if desired, with suitable annealing steps intervening between and/or following the expansion stages.

This feature is highly advantageous in that it ensures that each of the reinforcing rings 16, 16 is of exactly the right shape and dimensions to be snugly engaged by and provide adequate reinforcement for the bellows. In the methods of the prior art in which special forming dies are employed for forming the bellows, the reinforcing rings which are applied to the bellows subsequently almost invariably are of slightly different shape or dimensions than the forming die unless great care and expense are employed in their manufacture. Even then, since conventional reinforcing rings are metal castings, it is virtually impossible to obtain a perfect fit because of the inherent difficulties of obtaining perfect castings. These slight differences in size and shape, together with the gaps normally present between the several parts of a conventional reinforcing ring or forming die, lead to slight dimpling or distortion of the wall of bellows member 12 either during manufacture or during subsequent use or both. These minute distortions or stress concentrations, it has been found as pointed out above, lead to premature failure of the expansion joint under use conditions. By the method of the present invention, however, these difficulties are avoided and the durability and flex life of the expansion joint is greatly increased.

Rings 16, 16 of the embodiments shown in Figs. 1-8 may be applied in the same manner if desired, serving both as dies during the forming of the convolutions of bellows member 12 and as reinforcing members for controlling expansion thereof during use.

It will be appreciated that the improved construction of the present invention in addition to providing a very snug fit between the reinforcing or control rings and the bellows also makes it possible to vary the height of the individual convolutions of the bellows without changing the size or shape of the ring, the height of the convolutions being limited only by the ductility of the metal from which they are formed. Furthermore, since the reinforcing or control rings of the present invention engage substantially only the root of each bellows convolution and have no portions projecting beyond the outer periphery of the bellows, the expansion joint requires less space for installation as well as a greater range of compressibility, the joint being capable of compression to the point where the walls of adjacent convolutions actually come into contact with each other. Extremely lightweight constructions are possible with the present invention since the control rings are not only relatively small in overall dimensions but also may be hollow as shown in the drawings. This reduction in weight is accompanied by a reduction in brittleness because the heavier rings previously used have been castings, and cast iron or cast steel are notoriously brittle.

Although I have herein described specific embodiments of my invention, I do not intend to limit myself solely thereto, but to include all of the obvious variations and modifications within the spirit and scope of the appended claim.

I claim:

The method of making an expansion joint which comprises providing a pair of endless mating ring members, each of which is of uniform semi-circular cross-sectional configuration throughout its extent, providing a cylindrical tube of ductile metal, clamping said ring members about said tube spaced from the ends thereof with their mating faces abutting along a plane perpendicular to the axis of the tube, applying fluid pressure internally of said tube to force the wall of the tube outwardly on each side of the ring to form convolutions embracing the ring, and unclamping said ring members to leave them permanently engaged solely by said convolutions.

References Cited in the file of this patent

UNITED STATES PATENTS

| | | |
|---|---|---|
| 738,503 | Waters | Sept. 8, 1903 |
| 1,191,486 | Tyler | July 18, 1916 |
| 1,345,971 | Star | July 6, 1920 |
| 1,382,081 | Heiliger | June 21, 1921 |
| 1,929,401 | Badger | Oct. 10, 1933 |
| 2,018,613 | Hall | Oct. 22, 1935 |

(Other references on following page)

UNITED STATES PATENTS

| | | |
|---|---|---|
| 2,044,711 | Mantle | June 10, 1936 |
| 2,180,128 | Stancliffe | Nov. 14, 1939 |
| 2,489,844 | Zallea | Nov. 29, 1949 |
| 2,582,878 | Metcalf | Jan. 15, 1952 |
| 2,699,959 | Zallea | Jan. 18, 1955 |
| 2,707,972 | Cole | May 10, 1955 |
| 2,773,538 | De Mers | Dec. 11, 1956 |

FOREIGN PATENTS

| | | |
|---|---|---|
| 106,249 | Germany | Dec. 23, 1898 |
| 1,132 | Great Britain | Jan. 16, 1907 |